(12) United States Patent
Etter

(10) Patent No.: US 10,025,418 B2
(45) Date of Patent: Jul. 17, 2018

(54) MULTI-OBJECT ACOUSTIC SENSING

(71) Applicant: ETTER STUDIO LTD., Zurich (CH)

(72) Inventor: Christian Etter, Zurich (CH)

(73) Assignee: Etter Studio Ltd., Zurich (CH)

( * ) Notice: Subject to any disclaimer, the term of this patent is extended or adjusted under 35 U.S.C. 154(b) by 204 days.

(21) Appl. No.: 14/986,836

(22) Filed: Jan. 4, 2016

(65) Prior Publication Data

US 2016/0195953 A1 Jul. 7, 2016

Related U.S. Application Data

(60) Provisional application No. 62/099,301, filed on Jan. 2, 2015.

(51) Int. Cl.
| | |
|---|---|
| *G06F 3/043* | (2006.01) |
| *G06F 3/041* | (2006.01) |
| *G06F 3/0488* | (2013.01) |
| *G06F 1/16* | (2006.01) |
| *G06F 3/0354* | (2013.01) |

(52) U.S. Cl.
CPC ............ *G06F 3/0416* (2013.01); *G06F 1/169* (2013.01); *G06F 1/1626* (2013.01); *G06F 3/03547* (2013.01); *G06F 3/0433* (2013.01); *G06F 3/04883* (2013.01); *G06F 2200/1636* (2013.01); *G06F 2203/04104* (2013.01)

(58) Field of Classification Search
CPC .. G06F 3/0416; G06F 3/0433; G06F 3/04883; G06F 2200/1636; G06F 2203/04104
USPC ......................................................... 345/177
See application file for complete search history.

(56) References Cited

U.S. PATENT DOCUMENTS

| | | | |
|---|---|---|---|
| 2010/0073292 A1* | 3/2010 | Amm ................... | G06F 3/0383 345/163 |
| 2013/0181951 A1* | 7/2013 | Klinghult ............. | G06F 3/0416 345/177 |
| 2014/0247230 A1* | 9/2014 | Sheng .................. | G06F 3/0436 345/173 |

(Continued)

OTHER PUBLICATIONS

Felix Faire, "Augmented Acoustics: Further Exploration", webpage with video, 2014, https://vimeo.com/90477934.

(Continued)

*Primary Examiner* — Nicholas Lee
*Assistant Examiner* — Ngan T Pham Lu
(74) *Attorney, Agent, or Firm* — Alleman Hall Creasman & Tuttle LLP

(57) ABSTRACT

Acoustic sensing provides a mode by which user input is received by a computing device. As an example, a surface is acoustically monitored for interactions with one or more user-manipulated objects, such as a body part of the user or a variety of passive objects. Acoustic analysis of frequencies produced by such objects interacting with the surface enables these objects to be distinguished from each other. Multiple objects interacting with the surface at the same time may be associated with different types of user input to provide a multi-touch user interface for the computing device. The acoustic sensing techniques described herein support motion-based and tapping-based gestures using one, two, or more touch interactions with an acoustically monitored surface.

20 Claims, 10 Drawing Sheets

(56) References Cited

U.S. PATENT DOCUMENTS

2015/0371663 A1* 12/2015 Gustafson ............ G10L 15/265
  704/270.1

OTHER PUBLICATIONS

Pedro Lopes, "Augmenting Touch Interaction Through Acoustic Sensing", webpage with video, 2011, https://vimeo.com/30997725.
Pollen, S., "Acoustic Touch Screen Demonstration," YouTube Website, Available Online at https://www.youtube.com/watch?v=ZoAsIMiukAQ, May 23, 2011, 2 pages.
Future Interfaces Group, "Toffee: Enabling Ad Hoc, Around-Device Interaction with Acoustic Time-of-Arrival Correlation," YouTube Website, Available Online at https://www.youtube.com/watch?v=_Edph1kb4ck, Oct. 2, 2014, 2 pages.

* cited by examiner

MULTI-OBJECT ACOUSTIC SENSING

CROSS-REFERENCE TO RELATED APPLICATION

The present application claims the benefit of and priority to U.S. Provisional Patent Application Ser. No. 62/099,301, titled MULTI-OBJECT ACOUSTIC SENSING, filed Jan. 2, 2015, the entire contents of which are incorporated herein by reference in their entirety for all purposes.

BACKGROUND

Computing devices receive and process user input from a diverse range of input devices such as a keyboard, touchscreen, computer mouse, controller, inertial sensor, microphone, optical sensor, etc. Productivity of computer users is often improved by selecting the appropriate input device for the particular task at hand, with no single input device maximizing productivity across every task. Accordingly, computer users continually seek out and benefit from this diverse range of available input devices.

SUMMARY

In an aspect of the present disclosure, acoustic sensing provides a mode by which user input is received by a computing device. As an example, a surface is acoustically monitored for interactions with one or more user-manipulated objects, such as a body part of the user or a variety of passive objects. Acoustic analysis of frequencies produced by such objects interacting with the surface enables these objects to be distinguished from each other. Multiple objects interacting with the surface at the same time may be associated with different types of user input to provide a multi-touch user interface for the computing device. The acoustic sensing techniques described herein support motion-based and tapping-based gestures using one, two, or more touch interactions with an acoustically monitored surface. Acoustic sensing allows for an interaction area to be extended beyond the physical presence of the device itself. This summary introduces a selection of concepts described in further detail herein. Accordingly, this summary is intended to be non-limiting with respect to the subject matter further described by the detailed description and associated drawings.

DETAILED DESCRIPTION

Figure 1A:
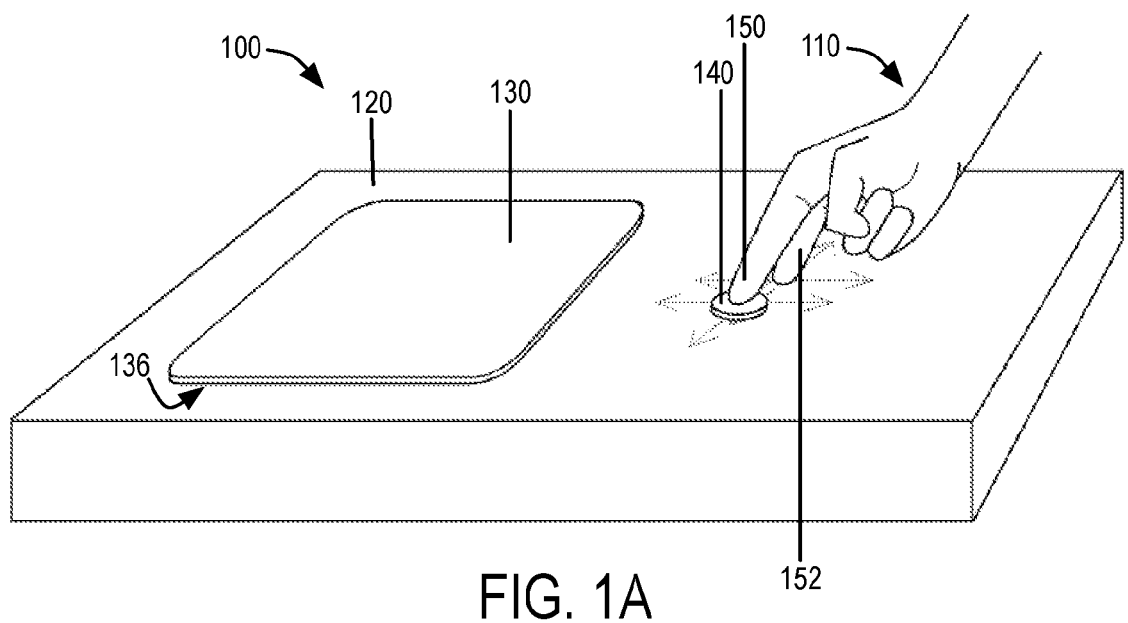
FIG. 1A depicts an example use-environment in which physical interactions between an acoustically monitored surface and user-manipulated objects serve as user input for a computing device.

The field of acoustic sensing faces several challenges toward providing an effective mode of user input to a computing device. Within the context of an acoustically monitored surface with which user-manipulated objects physically interact, a threshold issue includes distinguishing multiple objects from each other, which may be used to support a multi-touch user interface. Physical properties of not only the user-manipulated objects, but also the surface and its underlying structure significantly influence the acoustics produced by their interactions. Some of these physical properties include the mass, material density, shape, and surface structure of these objects.

To support portability and wide spread adoption of computing devices with integrated acoustic sensors, an effective approach to implementing acoustic sensing would benefit by accounting for a range of potential surfaces and their underlying structure that may be encountered by the computing device and its users. Additionally, an effective approach to implementing acoustic sensing would also benefit by accounting for a range of potential user-manipulated objects that may be used to interact with these surfaces. In combination, the shear breadth of potential surfaces and user-manipulated objects that may be selected by users results in an enormous quantity of potential object-surface combinations to be accommodated by the computing device.

Added to these challenges is the desire for the computing device to support a range of interactions associated with a respective range of user input types, including a variety of tapping-based and motion-based gestures. However, for interactions involving sliding motion between the surface and a user-manipulated object, the acoustics (e.g., frequency of vibration) produced by the interaction vary responsive to the magnitude of velocity and/or acceleration of that object relative to the surface. For motion-based gestures, interactions between each object-surface combination produce a range of acoustics (e.g., frequencies) across a range of velocity and/or acceleration magnitudes.

As an illustrative example of these challenges being combined in a use-environment, a user may concurrently manipulate two different objects to interact with the same surface using motion-based gestures such as swiping, pinching, etc. Depending on the physical properties of these objects and the surface with its underlying structure, the acoustics produced by each object interacting with the surface may at least partially overlap with each other within certain speed ranges, making it difficult to distinguish these objects from each other.

In addition to these challenges, computing devices supporting acoustic sensing that are portable or otherwise moveable between different surfaces or relative to a particular surface face the added challenge of identifying an orientation of the object-surface interaction relative to a reference frame of the computing device or the acoustic sensors. Knowledge of this relative orientation may be desirable if acoustic sensing is used for directing user input within a multi-dimensional user interface (e.g., a graphical user interface) having its own orientation and reference frame.

Some or all of the above challenges may be addressed by the acoustic sensing techniques disclosed herein. As a non-limiting example, a frequency signature may be created that describes a frequency-speed relationship for each object-surface combination that is observed by the computing device during an initialization phase. This pre-defined frequency signature may be used in a subsequent usage phase to distinguish two or more different objects from each other. Orientation of object-surface interactions relative to a reference frame of the computing device may be identified during this initialization phase, enabling these interactions to be used to direct user input within a multi-dimensional user interface. However, the disclosed and/or claimed subject matter may not address all or any of these challenges in certain scenarios. Accordingly, the disclosed and/or claimed subject matter is not necessarily limited to embodiments that address all or any of these challenges, unless otherwise defined as such.

FIG. 1A depicts an example use-environment 100 in which physical interactions between an acoustically monitored surface 120 and user-manipulated objects serve as user input for a computing device 130. Physical interactions include one or more objects making contact with surface 120, sliding across the surface, or being contacted by another object while resting upon the surface. A user-manipulated object may include a body part of a user 110 such as a finger 152, or a passive object 140 (i.e., non-body part object) such as a coin, stylus, or other suitable object, for example.

Within FIG. 1A, user 110 moves object 140 (e.g., a coin in this example) over surface 120 with finger 150, and may individually or concurrently move one or more other objects, such as a second, third, fourth, or fifth finger over surface 120 (e.g., finger 152). Movement of objects over surface may take the form of one or more gestures, such as a swipe, pinch, stretch, flick, free-form drawing, etc. that incorporate coordinated or independent user manipulation of one or more objects. User 110 may additionally or alternatively manipulate one or more objects to provide a tapping interaction.

Figure 9:
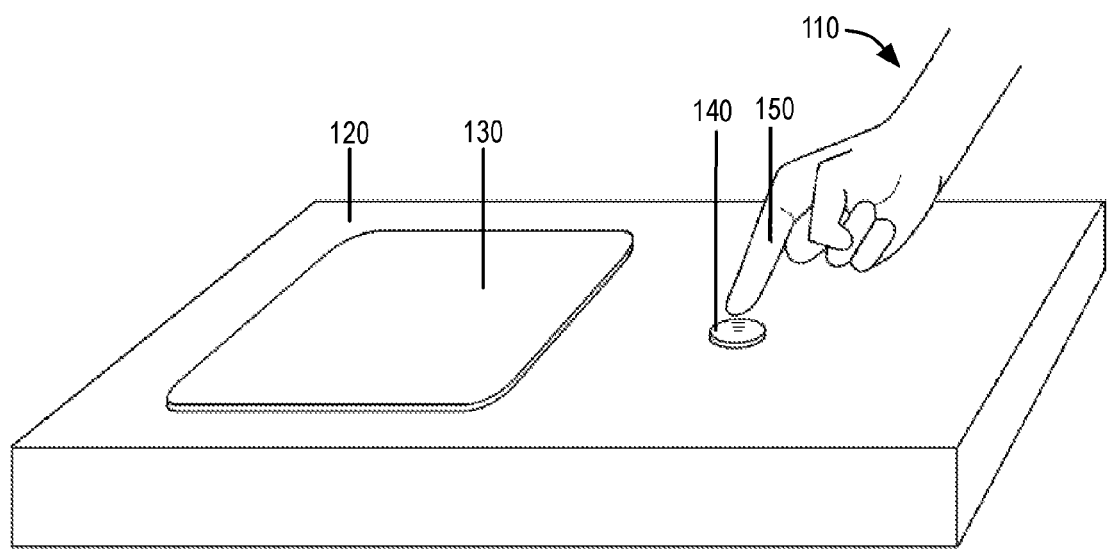
Figure 10:
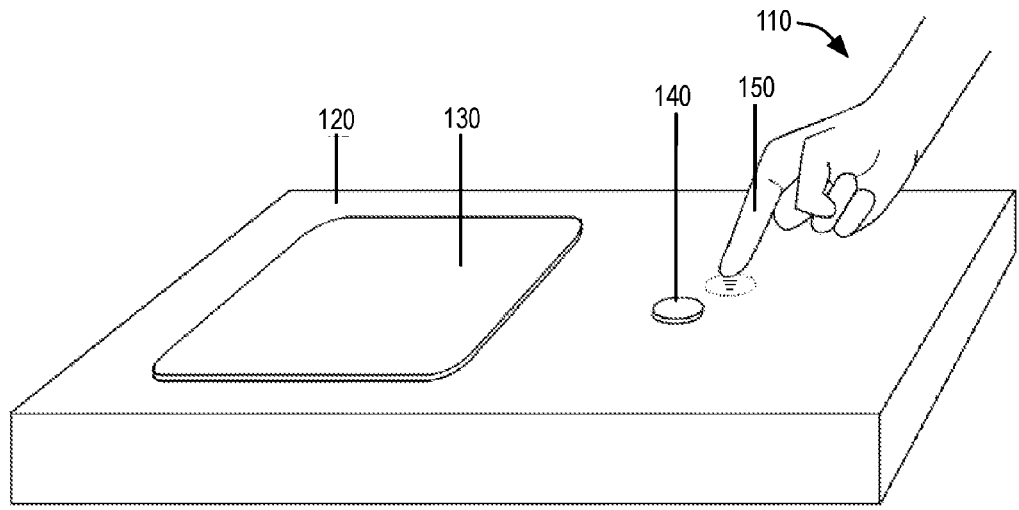
Figure 11:
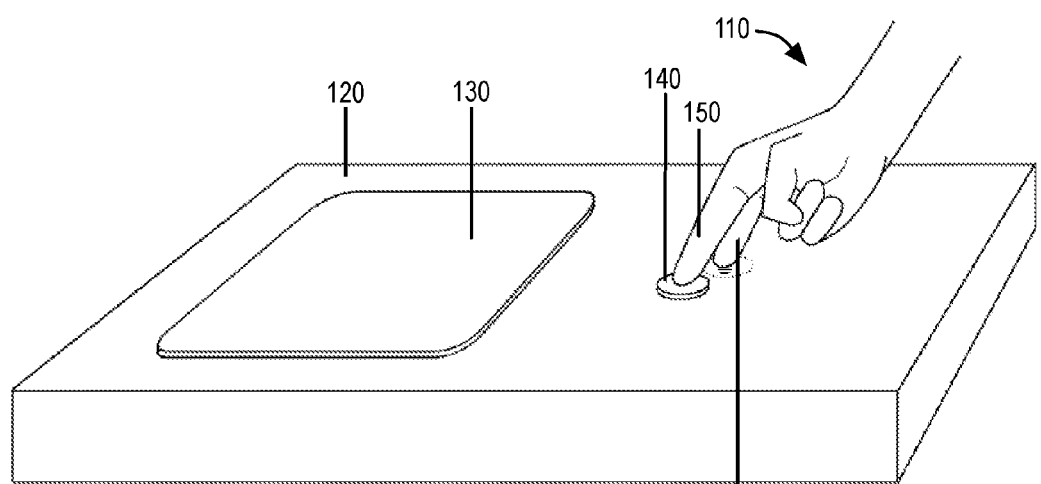
Figure 12:
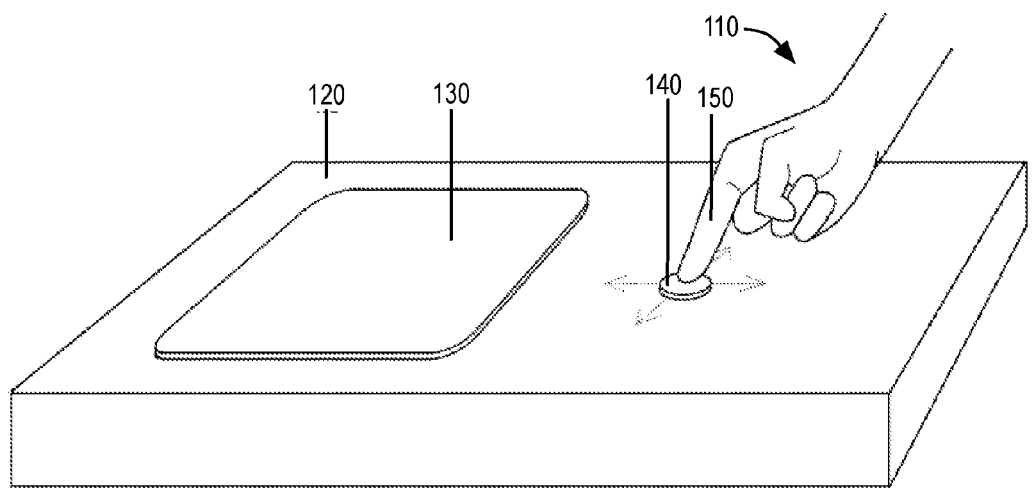
Figure 13:
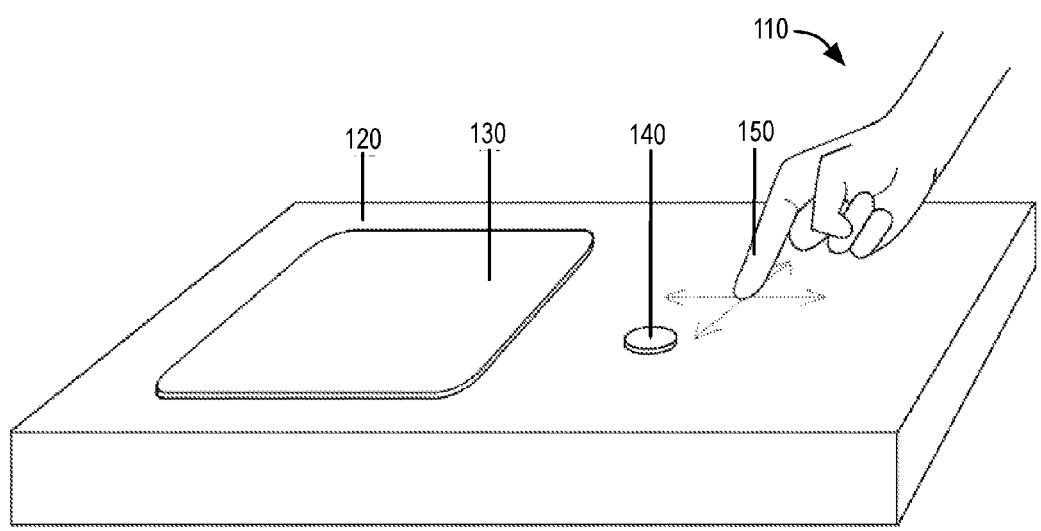

As a first example, user 110 may bring finger 152 into physical contact with surface 120 by performing a tapping gesture that includes one or more taps or touches. FIG. 10 depicts an example interaction of user 110 tapping directly upon surface 120 (e.g., with finger 150) that is acoustically monitored by computing device 130. As a second example, user 110 may slide finger 152 across the surface in one or more directions. FIG. 13 depicts an example interaction of user 110 moving a body-part object (e.g., finger 150) over surface 120 that is acoustically monitored by computing device 130. As a third example, user 110 may bring a passive object (e.g., object 140) into physical contact with surface 120 by performing a tapping gesture that includes one or more taps or touches. As a fourth example, user 110 may bring another object (e.g., finger 150) into physical contact with object 140 resting upon surface 120 by performing a tapping gesture that includes one or more taps or touches upon object 140. FIG. 9 depicts an example interaction of user 110 tapping object 140 resting upon surface 120 (e.g., with finger 150) that is acoustically monitored by computing device 130. As a fifth example, user 110 may slide a passive object (e.g., object 140) over surface 120 in one or more directions. FIG. 12 depicts an example interaction of user 110 moving object 140 over surface 120 (e.g., with finger 150) that is acoustically monitored by computing device 130. As a sixth example, user 110 may individually or concurrently slide two different objects (e.g., a body-part object and a passive object, or two different passive objects) over surface 120, each in one or more directions. FIG. 1 depicts an example interaction of user 110 concurrently moving finger 152 and object 140 over the surface in a variety of different directions (including relative to each other) to provide a multi-touch motion-based user input. As a seventh example, user 110 may independently or concurrently tap two different objects upon surface 120 and/or upon objects that rest upon surface 120. FIG. 11 depicts an example interaction of user 110 tapping directly upon surface 120 (e.g., with finger 152) that is acoustically monitored by computing device 130 to provide a secondary user input type, while object 140 (e.g., manipulated by finger 150) provides a primary user input type.

Figure 1B:
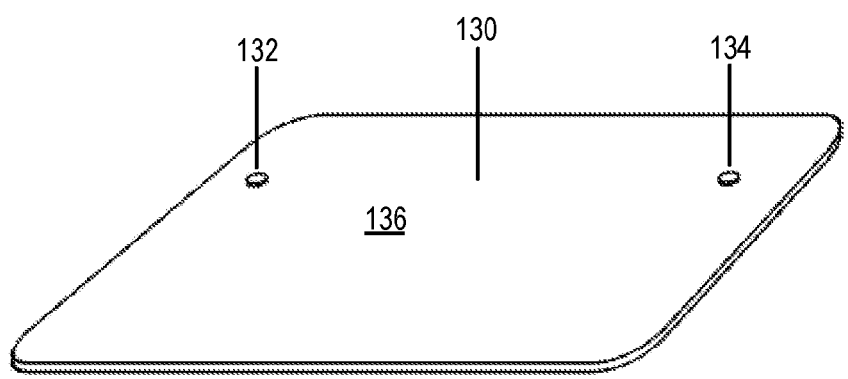
FIG. 1B depicts another view of the computing device of FIG. 1A.

Computing device 130 acoustically monitors surface 120 for physical interactions between user-manipulated objects and surface 120 using one or more acoustic sensors. FIG. 1B depicts another view of computing device 130 of FIG. 1A in which acoustic sensors 132 and 134 reside upon and/or protrude outward from an exterior surface 136 (e.g., of an enclosure) of computing device 130. As an example, exterior surface 136 forms an underside of computing device 130 in the orientation depicted in FIG. 1A that faces downward and toward surface 120. With this orientation, acoustic sensors 132 and 134 are each in physical contact with surface 120, and each measure acoustic vibration waves propagating through surface 120 that result from physical interaction of objects with surface 120, such as example objects 140 and 152.

Two or more acoustic sensors may be referred to as being spatially diverse if these sensors are spaced apart from each other, such as within a plane of surface 120. Two or more spatially diverse acoustic sensors enable measurement of a latency in a time of arrival of acoustic vibrations propagating through surface 120, which can be used to determine a location of interaction between each object and surface 120. This process may be referred to as triangulation of the location of interaction.

Computing device 130 receives acoustic measurements obtained by acoustic sensors 132 and 134, and interprets those measurements as user inputs to the computing device. User inputs may be used to generate commands that are carried out by the computing device. Physical interactions with ordinary surfaces such as tables, shelves, floors, etc. may be used to provide user input to a computing device as an alternative to or in addition to other types of input devices, such as a keyboard, mouse, game controller, touch-screen, microphone, optical sensor, inertial sensor, etc. Computing device 130 may take the form of a tablet computing device, handheld computing device, laptop or notebook computing device, desktop computing device, or other suitable electronic device.

Figure 2:
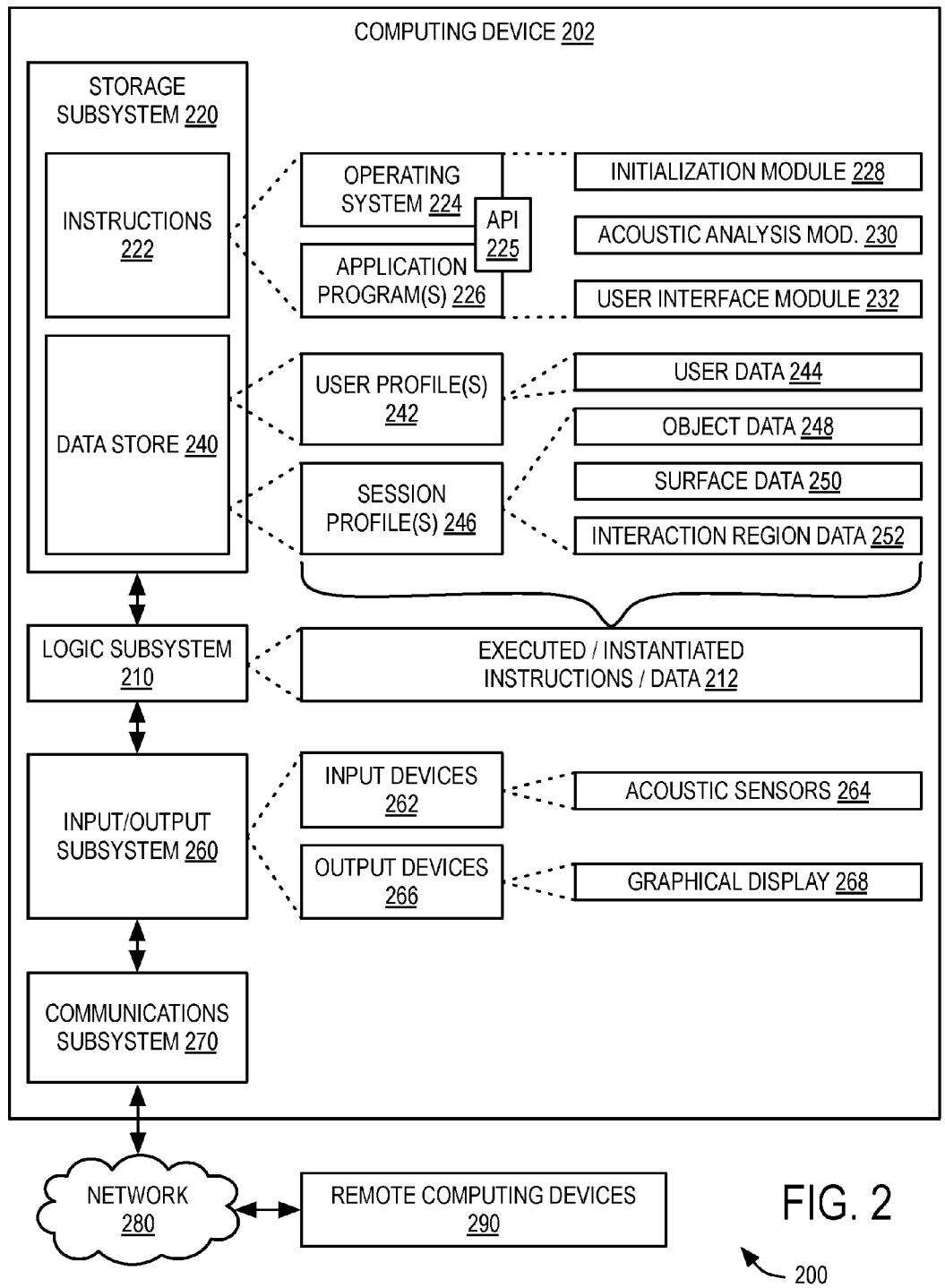
FIG. 2 is a schematic diagram depicting an example computing system.

The methods and processes described in herein may be tied to a computing system including one or more computing devices. FIG. 2 is a schematic diagram depicting an example computing system 200 and computing devices thereof that can perform one or more of the methods and processes described herein. Computing system 200 includes one or more computing devices, such as example computing device 202. Computing device 202 is a non-limiting example of previously described computing device 130 of FIG. 1. For example, computing device 202 may rest upon or be supported by a surface that is acoustically monitored by computing device 202.

Computing system 200 or computing device 202 thereof includes one or more physical, tangible hardware components such as a logic subsystem 210, a storage subsystem 220, an input/output subsystem 260, and a communications subsystem 270. Computing system 200 or computing device 202 thereof may take various forms, such as one or more personal computers, server computers, tablet computers, home-entertainment computers, network computing devices, gaming devices, mobile computing devices, mobile communication devices (e.g., smart phone), and/or other computing devices. The various components depicted in FIG. 2 or portions thereof may be provided within or united by a common enclosure or within two or more enclosures that are in communication with each other.

Storage subsystem 220 includes one or more physical, tangible, non-transitory hardware components that hold instructions 222 and/or data of a data store 240 in non-transitory form, and for at least a finite duration. Storage subsystem 220 may include removable and/or built-in devices. Storage subsystem 220 may include semiconductor memory devices, magnetic memory devices, optical memory devices, etc. Storage subsystem 220 may include one or more devices having one or more of the following attributes: volatile, nonvolatile, dynamic, static, read/write, read-only, random-access, sequential-access, location-addressable, file-addressable, and/or content-addressable.

Instructions 222 and/or data of data store 240 may be read from, stored or updated at, and/or removed from storage subsystem 220, as directed by logic subsystem 210. As an example, instructions 222 may include software such as an operating system 224 and one or more application programs 226 that are executable by logic subsystem 240. However, instructions 222 may take other suitable forms, including one or more hardware or firmware instruction sets. Operating system 224 may include or otherwise support an application programming interface (API) 225 by which application programs 226 communicate with operating system 224. As an example, commands generated by an operating system may be communicated to an application program via API 225, or vice-versa.

In at least some implementations, the various processes or methods described herein may include individual tasks that are implemented by respective software components referred to herein as modules. As an example, instructions 222 may include an initialization module 228 to provide an initialization phase, an acoustic analysis module 230 to analyze or otherwise process acoustic measurement data obtained from acoustic sensors, and a user interface module 232 to provide a user interface to which a user may direct user inputs, including user inputs obtained via acoustic sensing. It will be understood that instructions 222 may include other suitable modules to provide other features described herein.

Data store 240 may include various forms of data as described throughout the present disclosure. As an example, data of data store 240 may include one or more user profiles 242 containing user data 244 for respective users that may span or persist across multiple sessions to implement user settings or preferences, and one or more session profiles 246 containing object data 248 describing user-manipulated objects, surface data 250 describing acoustically monitored surfaces, and interaction region data 252 describing interaction regions, among other suitable forms of information. Data of data store 240 may be organized in any suitable form, such as by one or more databases of a database system that supports various data associations and relationships.

Logic subsystem 210 includes physical, tangible hardware in the form of one or more processor devices and/or logic machines to execute and/or instantiate instructions 222 as indicated at 212. Instructions 222 may be implemented by logic subsystem 210 to perform a process, a method, or otherwise achieve a particular result. As an example, the acoustic sensing techniques described herein may be implemented as part of an application program, an operating system, or a combination of an application program and operating system.

Input/output subsystem 260 includes or otherwise interfaces with one or more input devices 262 and/or one or more output devices 266. Non-limiting examples of an input device include a keyboard, touch-screen, computer mouse, controller, optical sensor, inertial sensor, acoustic sensor, etc. Non-limiting examples of an output device include a display device, audio speaker, haptic feedback device, etc. For example, output devices 266 may include a display device in the form of a graphical display 268 that presents a graphical user interface.

Input devices 262 may include one, two, three, four or more acoustic sensors 264. Acoustic sensors 264 may refer to acoustic sensors 132 and 134 of FIG. 1, for example. Triangulation of a position of an object typically relies on at least three spatially diverse sensors. Input devices 262 may include exactly three spatially diverse acoustic sensors in an example implementation. However, reducing the quantity of acoustic sensors may reduce the cost and/or complexity of the computing device or computing system. In another example implementation, input devices 262 may include exactly two spatially diverse acoustic sensors.

The use of only two spatially diverse sensors to triangulate a position of an object typically results in uncertainty as to whether the position of the object is located on a first side or an opposite second side of a symmetry plane passing through the two sensors. Typically, a third sensor is necessary to correctly eliminate this uncertainty. However, this uncertainty may be reduced or eliminated without the need for a third sensor by initializing a location of an interaction region relative to the computing device for subsequent acoustic sensing.

As described in further detail herein, a user may specify a relative location of the interaction region (e.g., to the right of, to the left of, in front of, or behind the computing device). In an example, a user specify the location of this interaction region by tracing a pre-defined pattern on the acoustically monitored surface in a pre-defined direction, enabling an orientation of the interaction and the location of the interaction region to be identified. In another example, a user may input the location of the interaction region via one or more menus or form fields.

Design considerations for the acoustic sensors include balancing the benefit of maximizing the distance (i.e., spatial diversity) between the acoustic sensors to increase accuracy or precision in resolving location of an object, minimizing the distance between point of interaction of a user-manipulated object with the surface and the acoustic sensors to maximize the strength of the acoustic vibrations measured by the acoustic sensors, maximizing an amount of weight of the computing device carried by the acoustic sensors and equalizing that weight among the acoustic sensors to maximize transfer of vibrations across the sensor-surface boundary without unduly unbalancing the computing device, maximizing the quantity of acoustic sensors while also accounting for cost/complexity of the computing device, positioning the acoustic sensors relative to the computing device to provide an acceptable angle to the measured interaction under typical operating conditions so that, for example, the location of the interaction is at the greatest angle relative to a line passing through the two closest acoustic sensors.

Communications subsystem 270 may include hardware and/or software components to facilitate wired and/or wireless communications between computing system 200 or computing device 202 with other computing systems or computing devices. Such hardware components may include wired and/or wireless receivers, transceivers, transmitters, signal processors, etc. As an example, computing device 202 is depicted in FIG. 2 communicating with remote computing device 290 over a communications network 280. Network 280 may include one or more of a wide area network, local area network, and/or personal area network. In at least some implementations, the techniques described herein may be performed by distributed processing by two or more computing devices of a computing system. As an example, computing device 202 and remote computing device 290 may cooperatively implement the processes or methods described herein.

Figure 3:
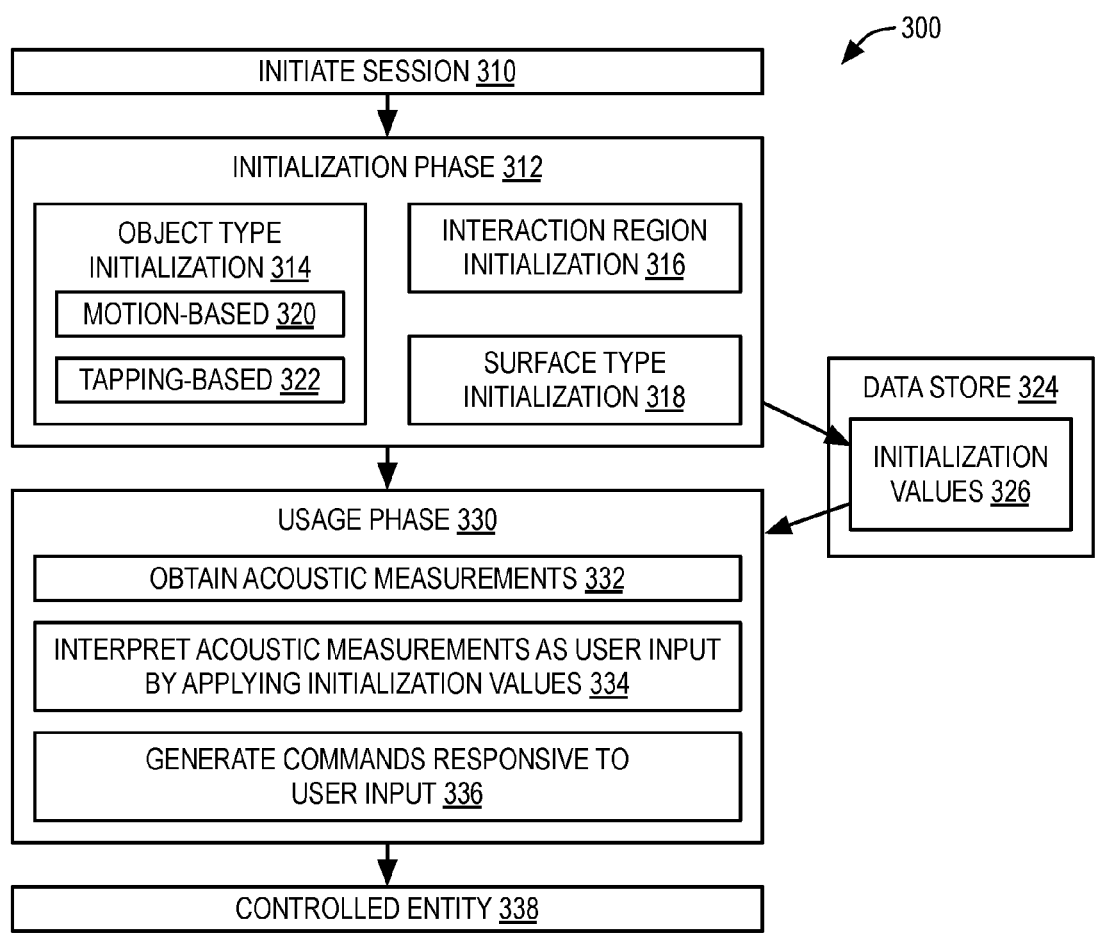
FIG. 3 is a flow diagram depicting an example acoustic sensing processing pipeline.

FIG. 3 is a flow diagram depicting an example acoustic sensing processing pipeline 300 in simplified form. In an example, processing pipeline 300 or portions thereof may be performed by a computing system or computing device such as example computing system 200 or computing device 202 of FIG. 2, for example. Aspects of processing pipeline 300 will be described in further detail with reference to the methods of FIGS. 3-5.

At 310, a session is initiated in which acoustic sensing of interactions between user-manipulated objects and an acoustically monitored surface to provide user input to a computing device. As non-limiting examples, a session may be initiated upon a user turning on a computing device, launching an application program or operating system, or receiving a command to initiate a session, such as responsive to a user action. A command to initiate a session, launch an application program or operating system, or turn on a computing device or computing system may be received from a user via a user input device other than the acoustic sensors, such as via a keyboard, touch-screen, computer mouse, etc. Alternatively or additionally, a command to initiate a session may be received via one or more acoustic sensors. In at least some implementations, the initiation of sessions at 310 may be implemented, at least in part, by initialization module 228 of FIG. 2.

At 312, an initialization phase may be performed. The initialization phase may include one or more of object type initialization 314, interaction region initialization 316, and/or surface type initialization 318. Object type initialization 314 may include one or more of motion-based initialization 320 and/or tapping-based initialization 322. Initialization values 326 obtained from initialization phase at 312 may be stored at a data store 324. In at least some implementations, the initialization phase at 312 may be implemented, at least in part, by initialization module 228 of FIG. 2.

Initialization values 326 may include one or more of previously described user data 244, object data 248, surface data 250, and/or interaction region data 252, among other suitable forms of information. In at least some implementations, initialization values 326 may include information obtained from sources other than an initialization phase, and may include pre-defined information from a manufacturer, software developer, user, and/or one or more previous sessions (e.g., based on user-profile information or other pre-defined values).

At 330, a usage phase may be performed. The usage phase may include one or more processes, including obtaining acoustic measurements at 332, interpreting acoustic measurements as user input by applying previously obtained initialization values 326 at 334, and generating commands response to user input at 336. Initialization values 326 may be retrieved or otherwise referenced from data store 324. Data store 324 is a non-limiting example of data store 240 of FIG. 2. In at least some implementations, a usage phase or a portion thereof may be implemented, at least in part, by acoustic analysis module 230 of FIG. 2.

Commands generated at 336 may be provided to a controlled entity 338. As an example, a controlled entity may refer generally to the same computing system or computing device that performs processes 310-336. A controlled entity may refer more specifically to an operating system or portion thereof, application program or portion thereof, or process of the computing system or computing device. In this example, a controlled entity may include or incorporate a user interface within which the user input is directed. In at least some implementations, a user interface may be managed by previously described user interface module 232 of FIG. 2, for example, by receiving interpreted acoustic measurements for one or more objects interacting with a surface, translating those interpreted acoustic measurements to user inputs of the user interface, and outputting commands for those user inputs. In at least some implementations, a user interface module may form part of an operating system. As another example, a controlled entity may refer to a different computing system, computing device, or other suitable electronic device apart from the computing system or computing device that performs processes 310-336, such as remote computing device 290 of FIG. 2.

Figure 4:
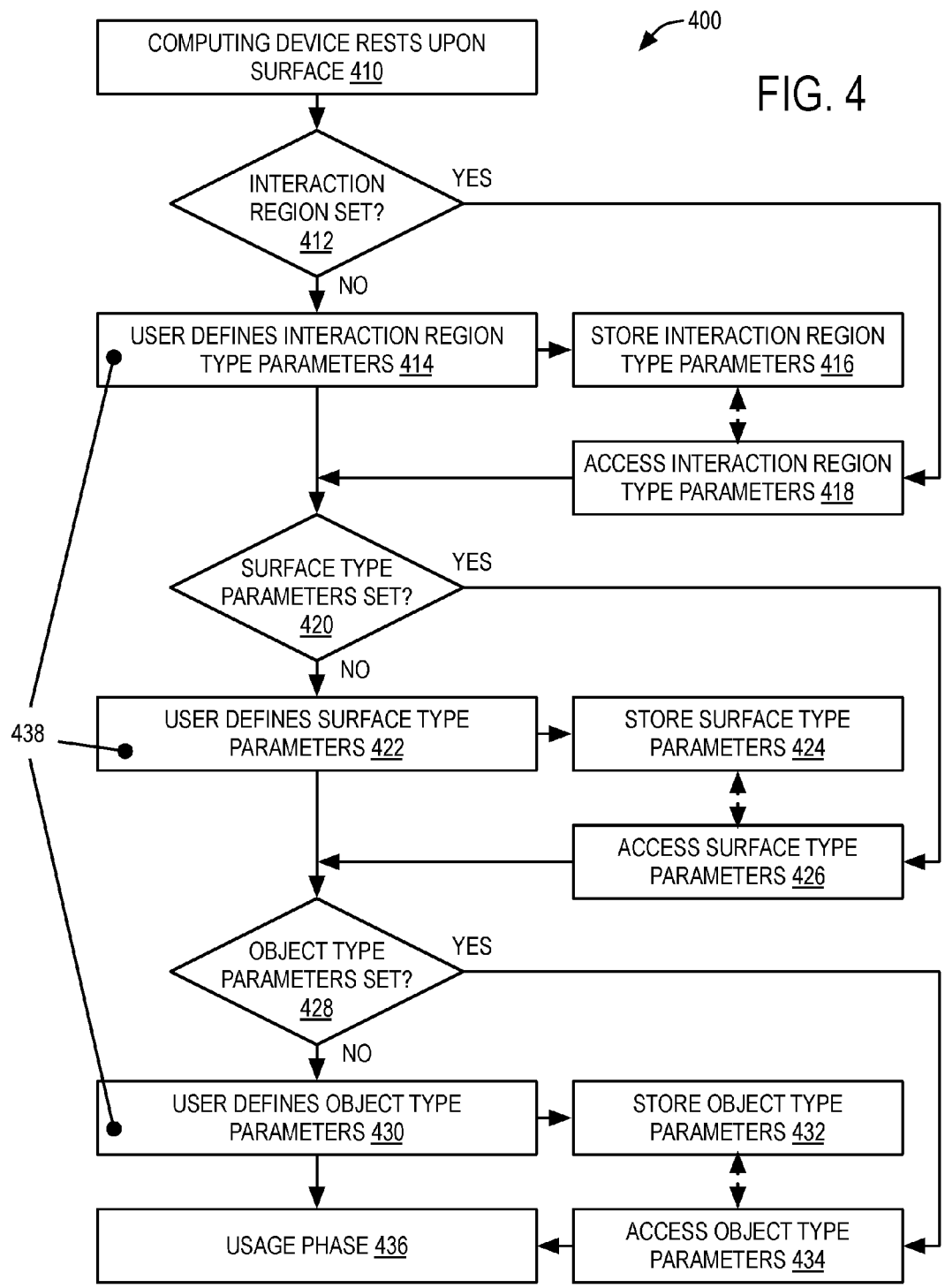
FIG. 4 is a flow diagram depicting an example method for obtaining initialization values as part of an initialization phase.

FIG. 4 is a flow diagram depicting an example method 400 for obtaining initialization values as part of an initialization phase. As an example, method 400 or portions thereof may be implemented by initialization module 228 of FIG. 2, and may be included as part of initialization phase 312 of pipeline 300 of FIG. 3.

At 410, a computing device rests upon a surface that is to be acoustically monitored, enabling acoustic sensors to interface with and acoustically monitor the surface. Within method 400, a user defines initialization values by actively providing initialization values (e.g., via a user input device) and/or by enabling the computing device to measure or otherwise learn initialization values from one or more observed interactions.

Initialization values may include interaction region parameters defined at 414, surface type parameters defined at 422, and/or object type parameters defined at 430 through one or more user interactions 438. In an example, these user interactions may include a user tapping an object upon a surface (including contacting a surface or providing multiple repetitive contacts to the surface or by contacting the object as it is resting upon the surface) and/or sliding the object over the surface. Alternatively or additionally, user interactions may include a user providing a user input to a user interface (e.g., a form field or menu of a graphical user interface) to manually or specifically define one or more parameters.

At 412, if parameters for an interaction region have not been set, then the process flow proceeds to 414. At 414, the user defines values for one or more interaction region parameters. Interaction region parameters may include a size, shape, location, and/or orientation of an interaction region on the surface to be subsequently used by the user for interacting with user-manipulated objects.

Figure 8:
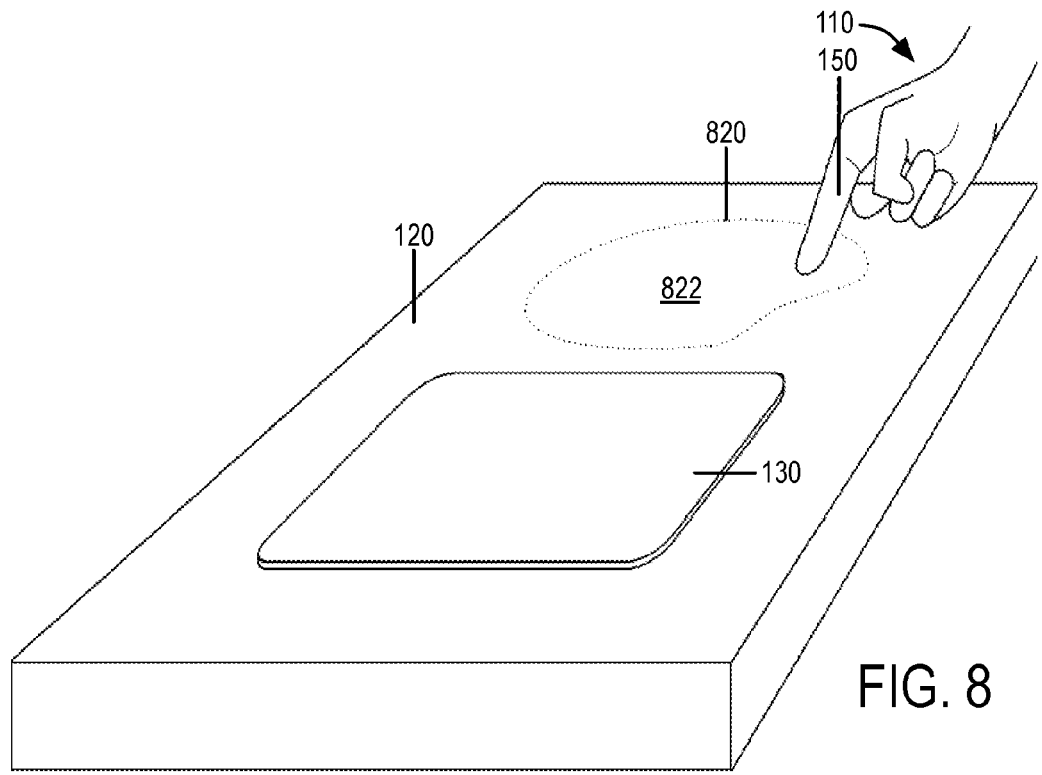
FIGS. 8-13 depict example interactions with an acoustically monitored surface.

As a non-limiting example, FIG. 8 depicts an example interaction of a body-part object (e.g., finger 150) of user 110 being moved over surface 120 that is acoustically monitored by computing device 130 to define an interaction region 822. Interaction region 822 is located on the right-hand side of computing device 130 as viewed from the perspective of user 110. Within this example, user 110 defines a size, shape, location, and/or orientation of interaction region 822 relative to computing device 130 by tracing a pattern 820 upon surface 120 by sliding an object (e.g., finger 150) along path 820.

At 416, the method includes optionally storing interaction region parameters at 414, such as previously described with reference to initialization values 326 of FIG. 3, for example. Interaction region parameters may take the form of previously described interaction region data 252 of FIG. 2, for example. From 414 or if parameters for an interaction region have been set at 412, then the process flow proceeds to 418, where the pre-defined parameters for the interaction region may be optionally accessed and utilized.

In an example, the computing device may reference a data store to determine whether interaction region parameters stored at the data store from a previous initialization phase are valid, and if valid, the computing device retrieves those interaction region parameters. Any suitable condition may be used to determine whether pre-defined and previously stored interaction region parameters are valid, including time-based conditions defining an expiration time, user-based conditions defining one or more users or user profiles for which the parameters are valid, session-based conditions defining a quantity of sessions for which the parameters are valid, etc.

At 420, if surface type parameters have not been set, then the process flow proceeds to 422. At 422, the user defines one or more surface type parameters. In an example, processes 414 and 422 may form part of the same user interaction or set of user interactions as indicated schematically by reference numeral 438. For example, for a given object type, such as finger 150 of user 110, surface parameters such as a frequency-speed relationship (e.g., a frequency signature) for the object-surface combination may be identified based on measurements obtained by the acoustic sensors for the same interaction or series of interactions used to define the interaction region.

In another example, processes 414 and 422 may form different user interactions or sets of user interactions, and may span two or more different sessions. For example, a user may define an interaction region to be associated with a user profile of that user to be applied across all sessions for that user profile, regardless of surface type or object type. As a non-limiting example, a right-handed user may define a usage region located on the right-hand side of the computing device to be used across multiple sessions even if the computing device is moved between different surfaces across those multiple sessions.

At 424, the method includes optionally storing surface type parameters, such as previously described with reference to initialization values 326 of FIG. 3, for example. Surface type parameters may take the form of previously described surface data 250 of FIG. 2, for example. From 424 or if parameters for a surface type have been set at 420, then the process flow proceeds to 426, where the pre-defined parameters for the surface type may be optionally accessed and utilized. Any suitable condition may be used to determine whether previously set surface type parameters are valid, such as whether the same session is active (e.g., indicating or suggesting the same surface type is present), whether a user has indicated that the surface type has changed, time-based conditions, session quantity conditions, user-specific conditions, etc.

At 428, if object type parameters have not been set, then the process flow proceeds to 430. At 430, the user defines one or more object type parameters. Object type parameters may be defined for each object type of one, two, three, or more object types, including any suitable quantity of object types. For a given surface type, object type parameters may be defined by the user moving that object over the surface to enable the computing device to measure and identify the frequency-speed relationship (e.g., a frequency signature) for that object-surface combination.

In an example, processes 430, 422, and/or 414 may form part of the same user interaction or set of user interactions as indicated schematically by reference numeral 438. For example, a user may define interaction region parameters, surface type parameters, and object type parameters by tracing a pattern on the surface with the object. In another example, processes 430, 422, and/or 414 may form different user interactions or sets of user interactions, and may span two or more different sessions. For example, a user may add or initialize a new object type by sliding the object over the surface after the interaction region has already been defined.

At 432, the method includes optionally storing object type parameters, such as previously described with reference to initialization values 326 of FIG. 3, for example. Object type parameters may take the form of previously described object data 248 of FIG. 2, for example. From 432 or if parameters for an object type have been set at 428, then the process flow proceeds to 434, where the pre-defined parameters for the object type may be optionally accessed and utilized. Parameters set within method 400 may be accessed and utilized within one or more subsequent usage phases as indicated at 436.

Figure 5:
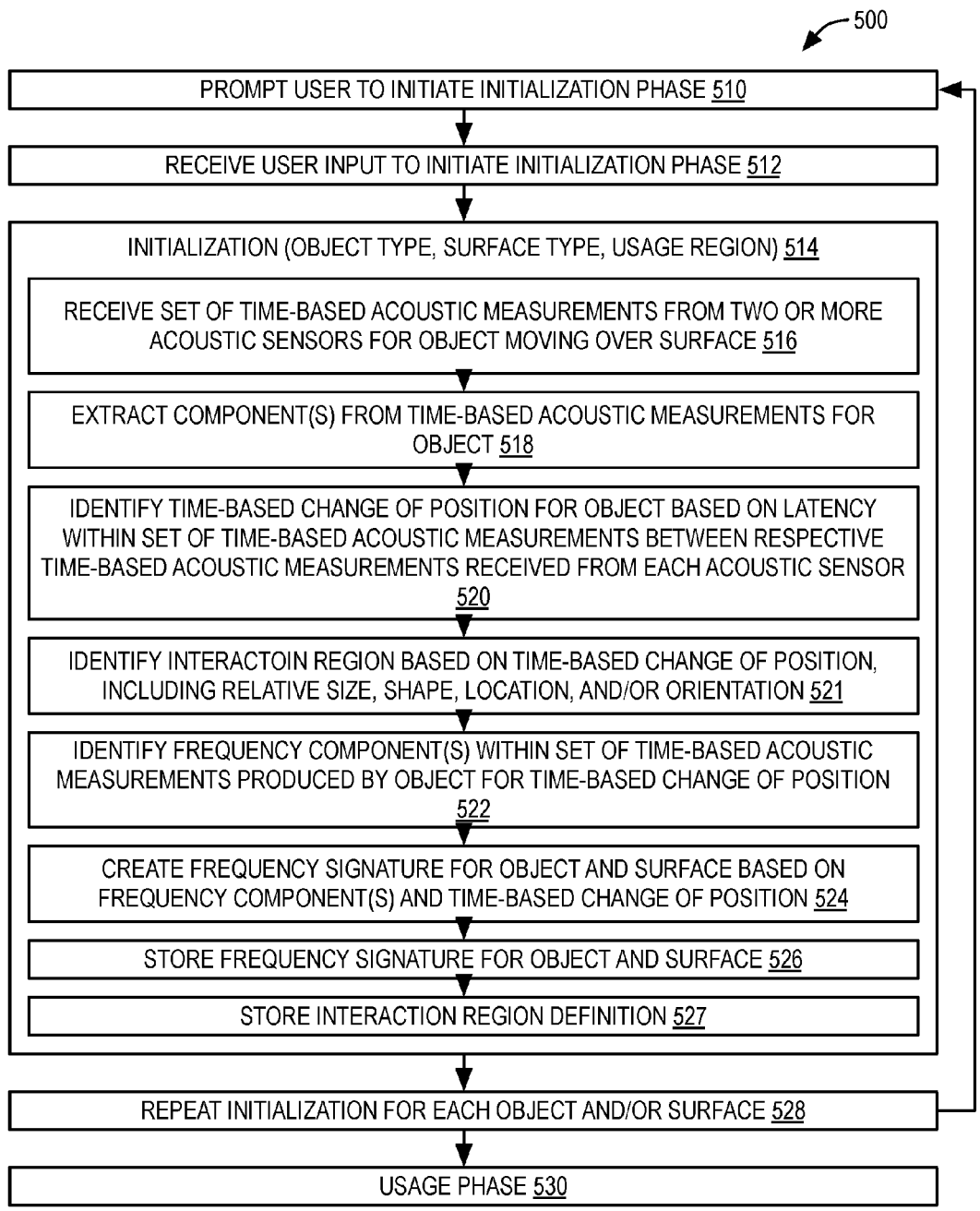
FIG. 5 is a flow diagram depicting an example method for implementing an initialization phase of an acoustic sensing processing pipeline.

FIG. 5 is a flow diagram depicting an example method 500 for implementing an initialization phase of an acoustic sensing processing pipeline, such as example processing pipeline 300 of FIG. 3. Method 500 or processes thereof may be performed by a computing device or computing system, such as example computing device 202 of FIG. 2, for example.

At 510, a user may be prompted to initiate an initialization phase that includes an associated initialization process flow. As an example, a computing device prompts a user by outputting a message via an output device. The output device may include, as non-limiting examples, a graphical display device that graphically displays the message, an audio speaker that audibly reproduces the message, or other suitable output device that presents the message to the user.

The message may request the user to provide one or more user inputs via one or more input devices to begin an initialization phase and/or to provide information defining aspects of the associated initialization process flow. As an example, the message may request the user to manipulate an object (e.g., the object to be initialized) to cause an interaction between the object and a surface (e.g., the surface to be initialized), such as the surface upon which the computing device is currently resting or supported.

The message may further indicate an interaction type, which may include a tapping-based interaction or a motion-based interaction, as non-limiting examples. A tapping-based interaction may include an object being manipulated by the user such that the object is brought into contact with the surface one or more times, which may be referred to as surface-tapping. A tapping-based interaction may further include an object that is resting upon the surface being contacted one or more times by another object that is manipulated by the user, which may be referred to as object-tapping. A motion-based interaction may include an object being manipulated by the user such that the object slides across or otherwise moves along the surface.

The message may further indicate an interaction pattern for the interaction type. For tapping-based interactions, an interaction pattern may include whether the interaction is surface-tapping or object-tapping, and a quantity of times the object is to be brought into contact with the surface for surface-tapping or a quantity of times another object is to be brought into contact with the object resting upon the surface for object-tapping.

For motion-based interactions, an interaction pattern may include a one or two-dimensional pattern to be traced by the object as the object slides across or otherwise moves along the surface. A one-dimensional pattern includes a straight line traced along the surface by the object moving in one or both directions along the line. A two-dimensional pattern includes movement of the object in each orthogonal direction within a plane of the surface. Non-limiting examples of two-dimensional patterns include geometric shapes such as a circle, ellipse, square, rectangle, etc., letters and numbers, and other suitable graphical symbols such as a plus sign, ampersand, star, etc.

In at least some implementations, the message may inform the user that the two-dimensional pattern defines the bounds (e.g., size, shape, and/or location) of the interaction region to be defined by the user's interaction with the surface. This interaction region definition enables scaling and mapping of user interactions to a user interface. For example, the message may request that the user surround or circumscribe a desired interaction region with a circle, square, or other shape to ensure that the user can reach all points within the interaction region and to maximize a distance between furthest points along the traced path for improving triangulation accuracy by the acoustic sensors. Additionally, initialization of an interaction region allows the computing device to listen or otherwise monitor a specific region to enable other sources of noise to be cancelled out or otherwise filtered.

For motion-based interactions, an interaction pattern may include a direction that the object is to be traced along the one or two-dimensional pattern. For one-dimensional patterns and two-dimensional patterns, the direction may be defined and described relative to the user and/or the computing device, such as forward, back, right, left, upward, downward, from the user toward the computing device, from the computing device toward the user, etc.

For two-dimensional patterns, the direction may be additionally defined and described relative to the pattern itself. For example, the direction with respect to a geometric shape may include clockwise, counter-clockwise, etc. Furthermore, direction may be inferred in some examples, such as with respect to certain numbers or letters that are typically traced in a particular direction.

The message may further indicate a target region for the interaction relative to the user and/or the computing device at or within which the user is to perform the tapping-based or motion-based interaction. As an example, the target region may be defined in terms of being in front of, behind, beside, to the right of, or to the left of the computing device or user, or between the computing device and user.

In at least some implementations, motion-based and tapping-based interactions may be combined in a variety of ways to create three-dimensional patterns. As an example, the message may indicate a tapping-based pattern in one or two dimensions within a plane of the surface that the user is to trace by tapping the object to the surface along the path to be traced rather than sliding the object across the surface. Within this implementation, a direction and/or target region may be indicated by the message.

In at least some implementations, the message may request the user to define other aspects of the associated initialization process flow by providing a user input via one or more other input devices, such as by selecting a graphical element via a touch-screen or computer mouse, pressing a button on a keyboard, speaking a phrase into a microphone, etc.) As an example, the message may indicate an initial value for and/or request a user-specified value or response be provide by the user for one or more of: (1) an object type to be initialized, (1) a surface type to be initialized, (3) an interaction region to be initialized, (4) a user input type with which the object type is to be associated, and/or (5) a user identity with which any of the previous four items are to be associated. The user may submit values or responses via respective form fields or menus of a user interface, as an example.

User input received at 512 (whether or not responsive to prompting at 510) may be used to initiate the initialization phase and associated initialization process flow using any of the user-specified values provided by the user to define aspects of the initialization phase. However, in at least some implementations, an initialization phase may be initiated and performed automatically and/or during a usage phase without prompting the user or otherwise notifying the user that an initialization phase has been initiated or is in progress.

Initialization at 514 may include one or more of processes 516-526 of an example initialization process flow performed in conjunction with a user manipulating an object to interact with a surface. The user-manipulated object may be selected as the object type to be initialized at 514. As an example, for an object type corresponding to a human finger, the user may manipulate his or her finger to interact with the surface. As another example, an object type corresponding to a non-body part object such as a coin, the user may manipulate the coin to interact with the surface.

Responsive to interaction between a user-manipulated object and a surface, at 516, the method includes receiving a set of time-based acoustic measurements obtained from one or more acoustic sensors for the object moving over the surface. The set of time-based acoustic measurements may includes measurements of multiple objects concurrently interacting with the surface.

At 518, the method includes extracting one or more components from the set of time-based acoustic measurements for each object. The method at 518 may include extracting a respective set of components from the set of time-based acoustic measurements for each object identified in the measurement data. Individual objects may be distinguished from each other based on differences in their relative behavior within sampled time period, including differences in position, velocity, acceleration, etc., and additionally based on differences in their respective frequency components and/or amplitudes.

At 520, the method includes identifying a time-based change of position for the object based on latency within the set of time-based acoustic measurements between respective time-based acoustic measurements received from each acoustic sensor. Latency in this context may refer to a difference in a time of arrival of corresponding events within the acoustic measurements.

At 521, the method includes identifying an interaction region based on the set of time-based acoustic measurements produced by the object for the time-based change of position. As previously described, a user may manipulate an object to trace an interaction region on a surface. At 522, the method includes identifying one or more frequency components within the set of time-based acoustic measurements produced by the object for the time-based change of position.

At 524, the method includes creating a frequency signature for the object and surface combination (i.e., an object-surface combination) based, at least in part, on the one or more frequency components and the time-based change of position. In at least some implementations, the method may further include associating each frequency signature with a corresponding user input type in a data store that may be subsequently referenced to provide a link between motion of an object identified by the frequency signature and the corresponding user input type. As an example, user input types may include a primary user input type that is analogous to a left-click on a computer mouse, a secondary user input type that is analogous to a middle-click or right-click on a computer mouse. As another example, user input types may include a left user input type and a right user input type within a multi-touch user input that considers relative motion or position of the left user input type and the right user input type.

At 526, the method includes storing the frequency signature for the object-surface combination. As previously described, a frequency signature may be stored in a data store. Each frequency signature may be associated with other suitable information, such as in a database. As an example, a frequency signature may be associated with an identifier of the object and/or surface of the object-surface combination that produced the frequency signature, a user identifier of a user profile, and/or a user input type. At 527, the method includes storing an interaction region definition for the interaction region identified at 521.

At 528, the method includes repeating the initialization process flow for each object and/or surface. For example, each unique object-surface combination may be associated with a respective frequency signature.

Figure 6:
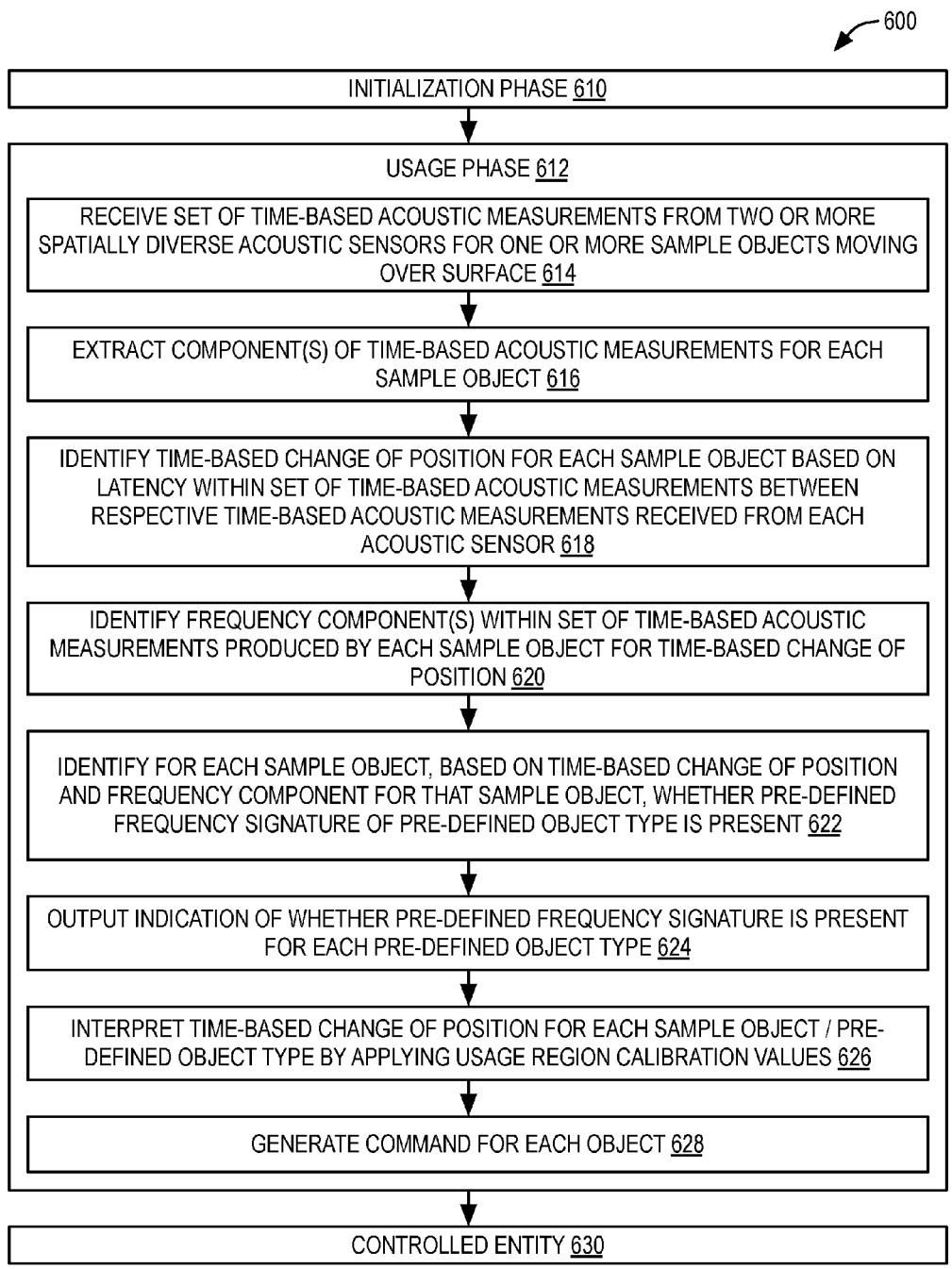
FIG. 6 is a flow diagram depicting an example method for implementing a usage phase of an acoustic sensing processing pipeline.

FIG. 6 is a flow diagram depicting an example method 600 for implementing a usage phase of an acoustic sensing processing pipeline, such as example processing pipeline 300 of FIG. 3. Method 600 or processes thereof may be performed by a computing device or computing system, such as example computing device 202 of FIG. 2, for example.

At 610, the method includes performing an initialization phase and associated initialization process flow, such as previously described with respect methods 400 and 500 of FIGS. 4 and 5, for example. At 612, the usage phase may be performed according to a usage phase process flow that includes one or more of processes 614-628.

At 614, the method includes receiving a set of time-based acoustic measurements from two or more spatially diverse acoustic sensors measuring a first object moving (i.e., a first sample object to be identified) over a surface. In an example, process 614 is similar to previously described process 516 of FIG. 5 with the exception of the object for which a frequency signature is to be created in method 500 being replaced with a sample object to be identified based on a previously learned frequency signature.

At 616, the method includes extracting one or more components of the set of time-based acoustic measurements for each sample object. Again, process 616 may be similar to previously described process 616 of FIG. 6.

At 618, the method includes identifying a first time-based change of position of the first sample object moving over the surface based on latency within the set of time-based acoustic measurements between respective time-based acoustic measurements received from each of the two or more spatially diverse acoustic sensors for that first sample object. A time-based change of position may include velocity and/or acceleration. Each acoustic sensor may obtain acoustic measurements at a sampling rate that enables position, velocity, and/or acceleration to be identified for each object. Changes to position, velocity, and/or acceleration over time for an object may be identified by comparing two or more instantaneous values obtained at different times within a time series of measurements.

In an example, latency may be identified based on comparison of features of a frequency component of the first sample object between the respective time-based acoustic measurements received from each of the two or more spatially diverse acoustic sensors. Such features may include changes in amplitude and/or frequency of the frequency component over time, which may be indicative of changes in position, velocity (speed and/or direction), acceleration (magnitude and/or direction), etc.

At 620, the method includes identifying within the set of time-based acoustic measurements, a first frequency component produced by the first sample object for the first time-based change of position. A frequency component may include one or more sub-components, such as one or more independent frequencies produced by an object moving over a surface. The frequency component may change over time if a velocity and/or acceleration of the object changes over that same period. Changes to the frequency component may be mapped to changes in a magnitude of velocity and/or acceleration, for example, to identify a relationship between frequency and speed for a particular object-surface combination.

At 622, the method includes determining for the first sample object, based on the first time-based change of position and the first frequency component, whether a pre-defined frequency signature of a pre-defined object type is present within the set of time-based acoustic measurements. A pre-defined frequency signature refers to a frequency signature previously created and/or stored for an object type. The method at 622 may be performed for each frequency signature of a plurality of predefined frequency signatures for respective pre-defined object types. The method at 622 may also be performed for each sample object of a plurality of sample objects identified within a set of time-based acoustic measurements. At 624, the method includes outputting an indication of whether the pre-defined frequency signature is present within the set of time-based acoustic measurements.

At 626, the method includes interpreting the time-based change of position for each sample object or present object type by applying interaction region values. As an example, movement of an object over a surface exhibiting a first frequency signature may be translated to a first user input type of a user interface of the computing device. For each frequency signature present in the set of time-based acoustic measurements for a sample object, the method at 626 may include attributing the sample object to the object type associated with that frequency signature by translating the time-based change of position for that sample object to associated user input type (e.g., of a user interface of the computing device).

Initialization of a usage region enables movement of an object to be mapped from the acoustically monitored surface to the movement of a virtual pointer in a graphical user interface, while not requiring spatial overlap of the input area with the area where the graphical user interface is presented. For example, initialization of a usage region may be used to confine an area on a surface that enables mapping and/or scaling of that area to an area of a user interface.

Process 626 may, for example, include identifying an orientation of a time-based change of position for an object type relative to the computing device based on a comparison of the time-based change of position and a pre-defined two-dimensional pattern having a pre-defined direction that is traced by the user. In at least some implementations, the orientation relative to the computing device further corresponds to an orientation within a reference frame of a user interface of the computing device. An orientation and/or other interaction region parameters may be associated with a user profile of a user stored at a data store. During a subsequent session, the orientation and/or other interaction region parameters may be referenced at the data store for the user, and the orientation and/or other interaction region parameters may be used for the subsequent session for the user.

At 628, the method includes generating a command, which is directed to and received by a controlled entity at 630. A controlled entity may include a process, application program, operating system, or device component of the computing device or of another computing devices.

Figure 7:
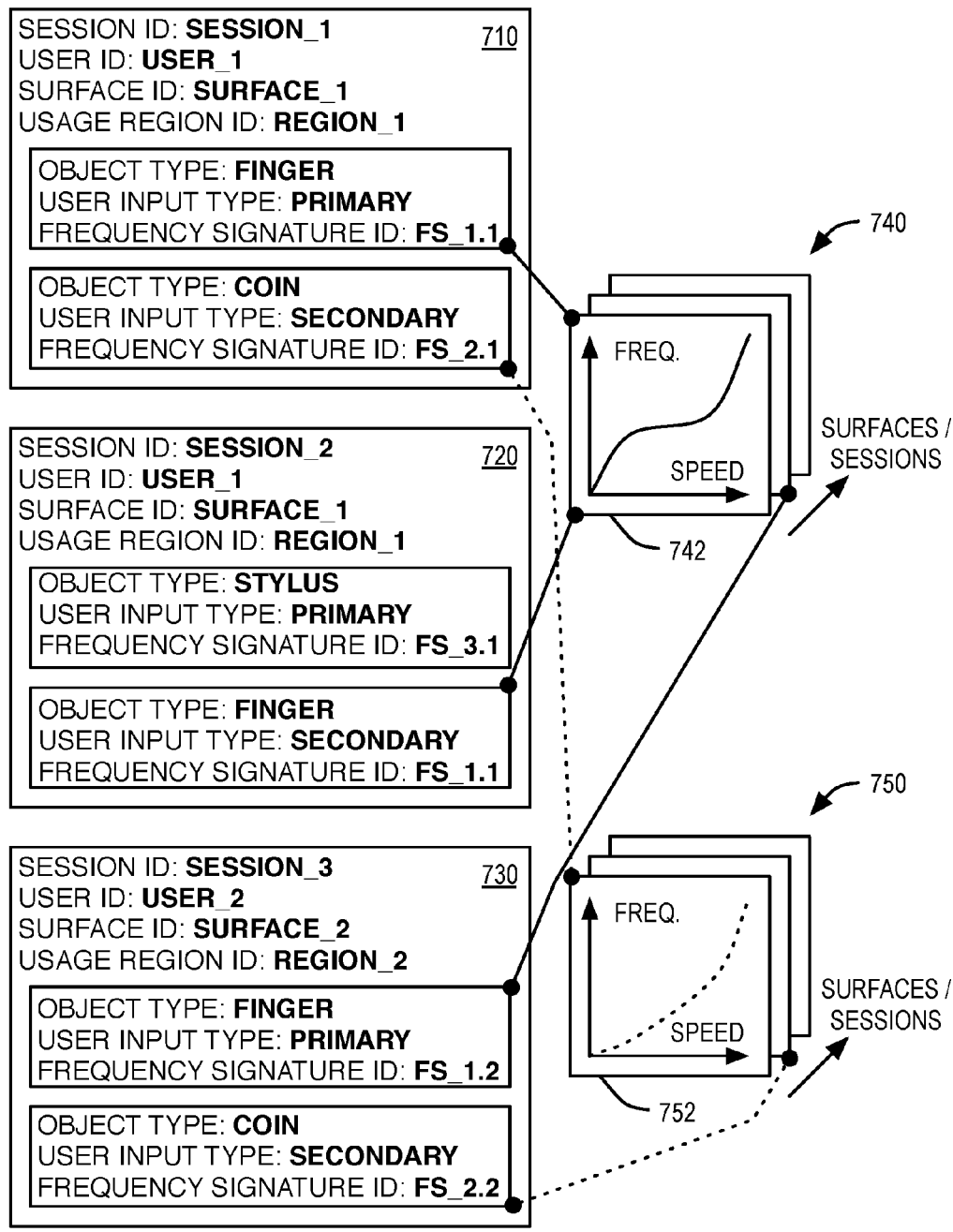
FIG. 7 is a schematic diagram depicting example data structures for organizing acoustic sensing data.

FIG. 7 is a schematic diagram depicting example data structures for organizing acoustic sensing data, including data obtained from an initialization phase that may be utilized during a usage phase of an acoustic sensing pipeline. The data depicted in FIG. 7 illustrates how a frequency produced by an object moving over a surface may vary responsive to a magnitude of a time-based change of position, such as a velocity magnitude (e.g., speed) and/or acceleration. The data depicted in FIG. 7 further illustrates how individual users may be associated with different interaction regions via user profile settings. The various identifiers and/or values depicted or described with reference to FIG. 7 may represent the various object type, surface type, and/or interaction region parameters defined by method 400 of FIG. 4, for example.

At 710, acoustic sensing data for a first session includes an association of a session identifier (ID) (e.g., session_1), user ID (e.g., user_1), surface ID (e.g., surface_1), interaction region ID (e.g., region_1), and two object types. A first object type (e.g., finger) is associated with a first user input type (e.g., primary) and a frequency signature ID (FS_1.1). A second object type (e.g., coin) is associated with a second user input type (e.g., secondary) and a frequency signature ID (FS_2.1).

FIG. 7 schematically depicts an example frequency signature 740 in the form of one or more frequency-speed maps for respective surface types and/or spanning multiple sessions. However, a frequency signature may take other suitable forms. Frequency-speed map 742 describes an example relationship between a range of speeds and a range of frequencies produced by the object type "finger" moving over the surface type "surface_1". Object type "finger" and surface type "surface_1" form an object-surface combination described by frequency-speed map 742 of frequency signature 740. Within FIG. 7, frequency signature ID "FS_1.1" corresponds to frequency-speed map 742 having two-dimensions in the frequency and speed domains. Frequency signature 740, including a collection of two or more frequency-speed maps, may include at least a third-dimension in the surface type and/or session domains.

FIG. 7 further depicts another example frequency signature 750 in the form of one or more frequency-speed maps for respective surface types and/or spanning multiple sessions. An example frequency-speed map 752 depicts an example relationship between a range of speeds and a range of frequencies produced by the object type "coin" moving over the surface type "surface_1". Object type "coin" and surface type "surface_1" form an object-surface combination described by frequency-speed map 752 of frequency signature 750. Within FIG. 7, frequency signature ID "FS_2.1" corresponds to frequency-speed map 752.

At 720, acoustic sensing data for a second session includes an association of a session identifier (ID) (e.g., session_2), user ID (e.g., user_1), surface ID (e.g., surface_1), interaction region ID (e.g., region_1), and two object types. A first object type (e.g., stylus) is associated with a user input type (e.g., primary) and a frequency signature ID (FS_3.1). A second object type (e.g., finger) is associated with a user input type (e.g., secondary) and a frequency signature ID (FS_1.1). Hence, in this example, the stylus has taken the role of primary user input type, and the finger has taken the role of second user input type in contrast to the primary user input type indicated at 710. Within FIG. 7, frequency signature ID "FS_1.1" of "session_2" again corresponds to frequency-speed map 742, for example, because the surface ID is the same as "session_1", denoting the same object-surface combination described by that frequency-speed map.

At 730, acoustic sensing data for a third session includes an association of a session identifier (ID) (e.g., session_3), user ID (e.g., user_2), surface ID (e.g., surface_2), interaction region ID (e.g., region_2), and two object types. In contrast to session_1 and session_2, session_3 is associated with a different user ID (e.g., user_2) and a different surface ID (e.g., surface_2). A first object type (e.g., finger) is associated with a user input type (e.g., primary) and a frequency signature ID (FS_1.2). Within FIG. 7, frequency signature ID "FS_1.2" corresponds to another frequency-speed map of frequency signature 740. A second object type (e.g., coin) is associated with a user input type (e.g., secondary) and a frequency signature ID (FS_2.2). Also within FIG. 7, frequency signature ID "FS_2.2" corresponds to another frequency-speed map of frequency signature 750. Session_3 also depicts an example of how a different user (e.g., user_2) may be associated with a different interaction region identifier (e.g., region_2) as compared to user_1 associated with session_1 and session_2.

While many of the techniques described herein are with respect to motion-based gestures involving sliding of an object over a surface, it will be understood that tapping-based gestures may be identified using similar techniques. As an example, a frequency produced by each object-surface combination during a tap or other touch may be measured during initialization and associated with individual object types and/or input types for later use in translating taps or touches during a usage phase.

It is to be understood that the configurations and/or techniques described herein are exemplary in nature, and that specific examples or embodiments are not to be considered in a limiting sense, because numerous variations are possible. The specific methods or processes described herein may represent one or more of any number of processing strategies. As such, various acts illustrated may be performed in the sequence illustrated, in other sequences, in parallel, or in some cases omitted. Likewise, the order of the above-described processes may be changed. The subject matter of the present disclosure includes all novel and nonobvious combinations and subcombinations of the various methods, processes, systems, configurations, and other features, functions, acts, and/or properties disclosed herein, as well as any and all equivalents thereof. Variations to the disclosed embodiments that fall within the metes and bounds of the claims, now or later presented, or the equivalence of such metes and bounds are embraced by the claims.

The invention claimed is:

1. An acoustic sensing method performed by a computing device, the method comprising:
   during an initialization phase:
      receiving a set of time-based acoustic measurements from two or more spatially diverse acoustic sensors measuring a first object type moving over a surface;
      identifying a first time-based change of position of the first object type moving over the surface based on latency within the set of time-based acoustic measurements between respective time-based acoustic measurements received from each of the two or more spatially diverse acoustic sensors;
      identifying within the set of time-based acoustic measurements, a first frequency component produced by the first object type for the first time-based change of position;
      creating a first frequency signature for the first object type based on the first frequency component and the first time-based change of position, the first frequency signature describing a relationship between frequency produced by the first object type and speed of the first object type moving over the surface; and
      outputting the first frequency signature.

2. The method of claim 1, further comprising:
   associating the first frequency signature with a first user input type in a data store; and
   wherein subsequent movement of the first object type over the surface exhibiting the first frequency signature is translated to the first user input type of a user interface of the computing device.

3. The method of claim 2, further comprising:
   during a usage phase following the initialization phase:
      identifying a sample frequency component and a sample time-based change of position for a sample object moving across the surface based on a sample set of time-based acoustic measurements received from the two or more spatially diverse acoustic sensors; and
      determining for the sample object, whether the first frequency signature is present within the sample set of time-based acoustic measurements based on the sample frequency component and the sample time-based change of position; and
      if the first frequency signature is present within the sample set of time-based acoustic measurements for the sample object, then attributing the sample object to the first object type by translating the sample time-based change of position for movement over the surface to the first user input type of the user interface of the computing device.

4. The method of claim 3, wherein the first frequency signature is one of a plurality of frequency signatures that further includes at least a second frequency signature describing a relationship between frequency produced by a second object type and speed of the second object type moving over the surface; and
   wherein the second frequency signature is associated with a second user input type in the data store.

5. The method of claim 4, further comprising:
   determining for the sample object, whether the second frequency signature is present within the sample set of time-based acoustic measurements based on the sample frequency component and the sample time-based change of position; and
   if the second frequency signature is present within the sample set of time-based acoustic measurements for the sample object, then attributing the sample object to the second object type by translating the sample time-based change of position for movement over the surface to the second user input type of the user interface of the computing device.

6. The method of claim 5, further comprising:
   during the usage phase following the initialization phase:
      identifying another sample frequency component and another sample time-based change of position for another sample object moving across the surface based on the sample set of time-based acoustic measurements received from the two or more spatially diverse acoustic sensors; and
      determining for the another sample object, whether the first frequency signature or the second frequency signature is present within the sample set of time-based acoustic measurements based on the another sample frequency component and the another sample time-based change of position; and
      if the first frequency signature or the second frequency signature is present within the sample set of time-based acoustic measurements for the another sample object, then attributing the another sample object to one of the first object type or second object type by translating the another sample time-based change of position for movement over the surface to a corresponding one of the first user input type or the second user input type of the user interface of the computing device.

7. The method of claim 6, wherein the sample time-based change of position for the sample object and the another sample time-based change of position for the another sample object are concurrent with each other;
   wherein the sample object is attributed to one of the first object type or the second object type, and the another sample object is attributed to the other of the first object type or the second object type; and
   wherein the first user input type and the second user input type collectively provide a multi-touch user input of the user interface of the computing device.

8. The method of claim 4, wherein the first object type is one of a body-part object of the user or a passive object; and
   wherein the second object type is another of the body-part object of the user or the passive object.

9. The method of claim 1, further comprising:
   during the initialization phase,
   prompting the user to move the first object type over the surface in a pre-defined two-dimensional pattern having a pre-defined direction;
   wherein the set of time-based acoustic measurements include measurements received from each of the two or more spatially diverse acoustic sensors for the first object type moving over the surface in the pre-defined two-dimensional pattern having the pre-defined direction; and
   identifying an orientation of the first time-based change of position for the first object type relative to the computing device based on a comparison of the first time-based change of position and the pre-defined two-dimensional pattern having the pre-defined direction.

10. The method of claim 9, wherein the orientation relative to the computing device further corresponds to an orientation within a reference frame of a user interface of the computing device.

11. The method of claim 10, further comprising:
associating the orientation relative to the computing device with a user profile of the user stored at the data store;
wherein during a subsequent session, referencing the orientation relative to the computing device stored at the data store for the user; and
setting the orientation relative to the computing device for the subsequent session.

12. The method of claim 1, wherein the latency is identified based on comparison of features of the first frequency component between the respective time-based acoustic measurements received from each of the two or more spatially diverse acoustic sensors.

13. An acoustic sensing method performed by a computing device, the method comprising:
receiving a set of time-based acoustic measurements from two or more spatially diverse acoustic sensors measuring a first sample object moving over a surface;
identifying a first time-based change of position of the first sample object moving over the surface based on latency within the set of time-based acoustic measurements between respective time-based acoustic measurements received from each of the two or more spatially diverse acoustic sensors;
identifying within the set of time-based acoustic measurements, a first frequency component produced by the first sample object for the first time-based change of position;
determining for the first sample object, based on the first time-based change of position and the first frequency component, whether a pre-defined first frequency signature of a first object type or a pre-defined second frequency signature of a second object type is present within the set of time-based acoustic measurements, each frequency signature describing a different relationship between frequency produced by a corresponding object type and speed of that object type moving over the surface; and
outputting an indication of whether the pre-defined first frequency signature or the pre-defined second frequency signature is present within the set of time-based acoustic measurements for the first sample object.

14. The method of claim 13, further comprising:
if the pre-defined first frequency signature is present within the set of time-based acoustic measurements for the first sample object, then attributing the first sample object to the first object type by translating the first time-based change of position for movement over the surface to a first user input type of a user interface of the computing device; and
if the pre-defined second frequency signature is present within the set of time-based acoustic measurements for the first sample object, then attributing the first sample object to the second object type by translating the first time-based change of position for movement over the surface to a second user input type of the user interface of the computing device.

15. The method of claim 14, wherein the set of time-based acoustic measurements received from the two or more spatially diverse acoustic sensors further includes measurements of a second sample object moving over the surface; and wherein the method further comprises:
identifying a second time-based change of position of the second sample object moving over the surface based on latency within the set of time-based acoustic measurements between respective time-based acoustic measurements received from each of the two or more spatially diverse acoustic sensors;
identifying within the set of time-based acoustic measurements, a second frequency component produced by the second sample object for the second time-based change of position;
determining for the second sample object, based on the second time-based change of position and the second frequency component, whether the pre-defined first frequency signature of the first object type or the pre-defined second frequency signature of the second object type is present within the set of time-based acoustic measurements; and
outputting an indication of whether the pre-defined first frequency signature or the pre-defined second frequency signature is present within the set of time-based acoustic measurements for the second sample object.

16. The method of claim 15, further comprising:
if the pre-defined first frequency signature is present within the set of time-based acoustic measurements for the second sample object, then attributing the second sample object to the first object type by translating the second time-based change of position for movement over the surface to the first user input type of the user interface of the computing device; and
if the pre-defined second frequency signature is present within the set of time-based acoustic measurements for the second sample object, then attributing the second sample object to the second object type by translating the second time-based change of position for movement over the surface to the second user input type of the user interface of the computing device.

17. The method of claim 14, wherein one or both of the pre-defined first frequency signature and pre-defined second frequency signature were created by the computing device based on a previously measured relationship between frequency produced by the corresponding object type and speed of that object type moving over the surface during an initialization phase.

18. The method of claim 17, further comprising:
during the initialization phase,
prompting the user to move the first object type over the surface in a pre-defined two-dimensional pattern having a pre-defined direction; and
identifying an orientation of a time-based change of position for the first object type relative to the computing device based on a comparison of that time-based change of position and the pre-defined two-dimensional pattern having the pre-defined direction;
wherein the orientation relative to the computing device further corresponds to an orientation within a reference frame of the user interface of the computing device.

19. The method of claim 13, wherein the two or more spatially diverse acoustic sensors interface with the surface, and are integrated with the computing device.

20. A computing device, comprising:
an enclosure;

two or more spatially diverse acoustic sensors protruding outward from the enclosure of the computing device to interface with a surface to be acoustically monitored by the computing device;

a logic subsystem located within the enclosure; and a storage subsystem located within the enclosure, and having instructions stored thereon executable by the logic subsystem to:

receive a set of time-based acoustic measurements from the two or more spatially diverse acoustic sensors measuring a first sample object moving over the surface;

identify a first time-based change of position of the first sample object moving over the surface based on latency within the set of time-based acoustic measurements between respective time-based acoustic measurements received from each of the two or more spatially diverse acoustic sensors;

identify within the set of time-based acoustic measurements, a first frequency component produced by the first sample object for the first time-based change of position;

determine for the first sample object, based on the first time-based change of position and the first frequency component, whether a pre-defined first frequency signature of a first object type or a pre-defined second frequency signature of a second object type is present within the set of time-based acoustic measurements, each frequency signature describing a different relationship between frequency produced by a corresponding object type and speed of that object type moving over the surface;

if the pre-defined first frequency signature is present within the set of time-based acoustic measurements for the first sample object, then attribute the first sample object to the first object type by translating the first time-based change of position for movement over the surface to a first user input type of a user interface of the computing device; and if the pre-defined second frequency signature is present within the set of time-based acoustic measurements for the first sample object, then attribute the first sample object to the second object type by translating the first time-based change of position for movement over the surface to a second user input type of the user interface of the computing device.

* * * * *